(12) United States Patent
Attard

(10) Patent No.: US 6,425,245 B1
(45) Date of Patent: Jul. 30, 2002

(54) MASTER CYLINDER WITH VALVES HAVING REDUCED CLUTCH PEDAL FREE PLAY

(75) Inventor: Jean-Marc Attard, Chantilly (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/180,205

(22) PCT Filed: Oct. 7, 1998

(86) PCT No.: PCT/FR98/02146

§ 371 (c)(1),
(2), (4) Date: Oct. 30, 1998

(87) PCT Pub. No.: WO99/22976

PCT Pub. Date: May 14, 1999

(30) Foreign Application Priority Data

Oct. 30, 1997 (FR) .......................................... 97 13588

(51) Int. Cl.⁷ .................................................. F15B 7/08
(52) U.S. Cl. ........................................................ 60/589
(58) Field of Search ............................ 60/585, 588, 589, 60/586

(56) References Cited

U.S. PATENT DOCUMENTS

| | | | | |
|---|---|---|---|---|
| 2,071,059 A | * | 2/1937 | Bowen | 60/588 |
| 2,148,232 A | * | 2/1939 | Bowen | 60/588 |
| 2,241,112 A | * | 5/1941 | Bowen | 60/588 |
| 6,065,279 A | * | 5/2000 | Kuromitsu et al. | 60/588 |
| 6,065,292 A | * | 5/2000 | Unterberg | 60/589 |

* cited by examiner

*Primary Examiner*—Edward K. Look
*Assistant Examiner*—Igor Kershteyn
(74) *Attorney, Agent, or Firm*—Leo M. McCormick, Jr; Warren Comstock

(57) ABSTRACT

A master cylinder having a body (10) with a bore (12) therein in which slides at least a primary piston (20). The primary piston (20) has a compensation passage (58), which in a position of rest, places a pressure chamber (24) in communication with a reservoir (14). The communication between interrupted upon actuation of the master cylinder by a control rod (18) acting on a second piston (48) sliding in the bore (12). A first compression spring (28) and a second compression spring (42) urge the primary piston (20) and second spring (16) toward a rear position of rest. The preload force of the first compression spring (28) exceeding that of the second compression spring (16) such that the second piston (48) is the first to move in response to a force applied to the control rod (18). The rear position of rest for the primary piston (200 and second piston (48) is defined by a same stop (36) which is integral with the body (10) of the master cylinder.

10 Claims, 2 Drawing Sheets

MASTER CYLINDER WITH VALVES HAVING REDUCED CLUTCH PEDAL FREE PLAY

The present invention relates to master cylinders, of the type with valves, and which are intended in particular to equip hydraulic braking circuits of motor vehicles.

BACKGROUND OF THE INVENTION

A valve-type master cylinder consists, in the conventional way, of a bore formed in a body and in which there slides at least one primary piston provided with a compensation passage capable of placing a pressure chamber of the master cylinder in communication with a reservoir of fluid at low pressure when the master cylinder is in its position of rest, its communication being interrupted by a second piston upon actuation of the master cylinder by a control rod acting on the second piston sliding in the bore of the master cylinder, a first compression spring urging the primary piston towards a rear position of rest, a second compression spring being arranged between the primary piston and the second piston and urging the latter towards a rear position of rest, the preload at rest of the first compression spring exceeding the preload at rest of the second compression spring.

A valve-type master cylinder of this kind is known, for example, from document GB-B-1,155,160. In this known master cylinder, the primary piston rests, in the position of rest, on a stop formed at the end of a screw interacting with a tapped bore formed in the body of the master cylinder, while the second piston rests, in the position of rest, on an annular stop kept at the rear end of the bore of the body of the master cylinder.

Upon actuation of such a master cylinder via the control rod, the second piston is lifted off its rear stop to move to seal the compensation passage so as to interrupt the communication between the pressure chamber of the master cylinder and the reservoir of fluid at low pressure, and so that the pressure in the pressure chamber can increase.

This travel of the control rod needed to achieve closure of the compensation passage is known in the field of braking by the name of master cylinder dead travel. Depending on the manufacturing tolerances on the various elements of which a master cylinder is composed, it will be understood then that the dead travel can vary across a production run. Furthermore, with the objective of obtaining a braking action as soon as possible after the beginning of the actuation of the master cylinder, it is very important on the one hand for its dead travel to be as small as possible and on the other hand for it to be possible for this travel to be set to this minimum value when the master cylinder is assembled and for it to keep this minimum value during use of the master cylinder.

In the master cylinder known from the aforementioned document, the dead travel is determined by the positions of rest of the primary piston and of the second piston are determined respectively by a stop screw and an annular stop, the relative positions of which can vary over the course of time or over the course of the operation of the master cylinder. [sic].

SUMMARY OF THE INVENTION

The object of the present invention is therefore to provide a master cylinder in which the dead travel can be set simply to a minimum value and which keeps this minimum value throughout the use of the master cylinder, it being necessary also for this master cylinder to be obtained using means which are simple and quick to employ in a reliable and inexpensive way.

According to the present invention, the rear positions of rest of the primary piston and of the input piston are defined by the same stop integral with the body of the master cylinder.

Other objectives, features and advantages of the present invention will emerge more clearly from the description which follows of one embodiment given by way of illustration with reference to the appended drawings.

DETAILED DESCRIPTION OF THE INVENTION

Figure 1:
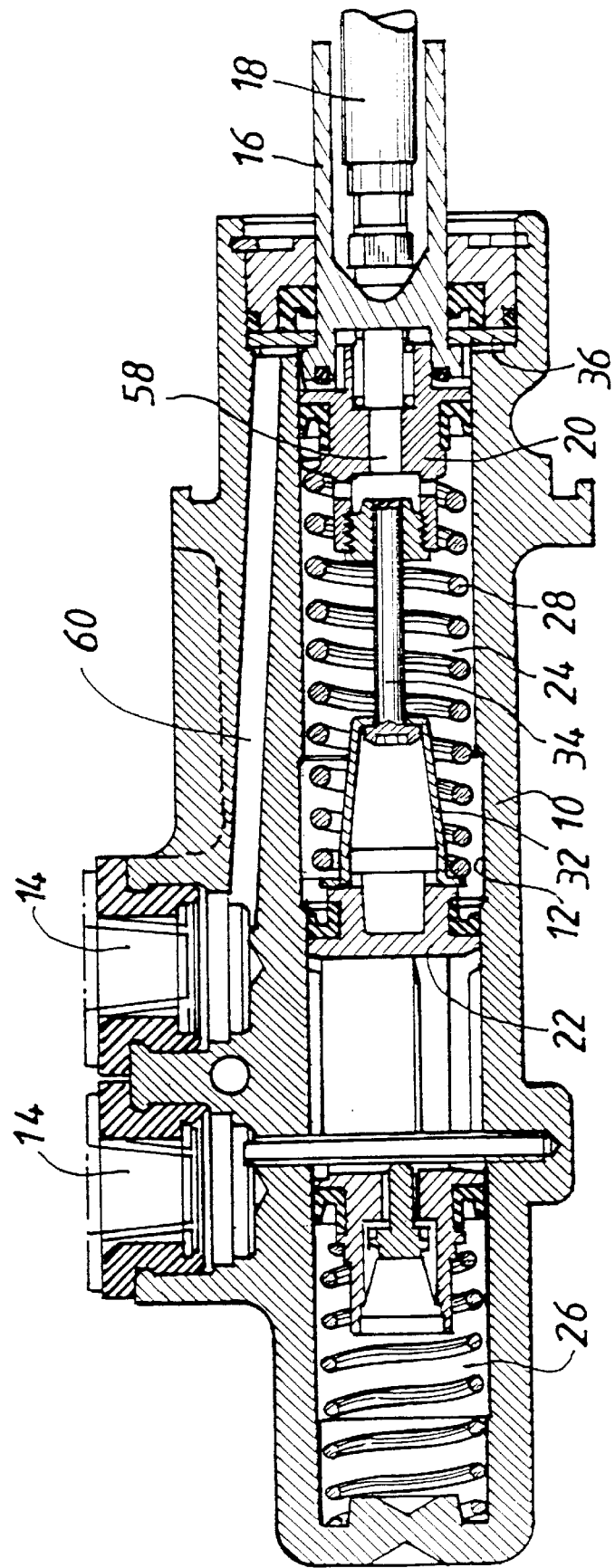
FIG. 1 is a side view in longitudinal section of a master cylinder produced in accordance with the present invention.
Figure 2:
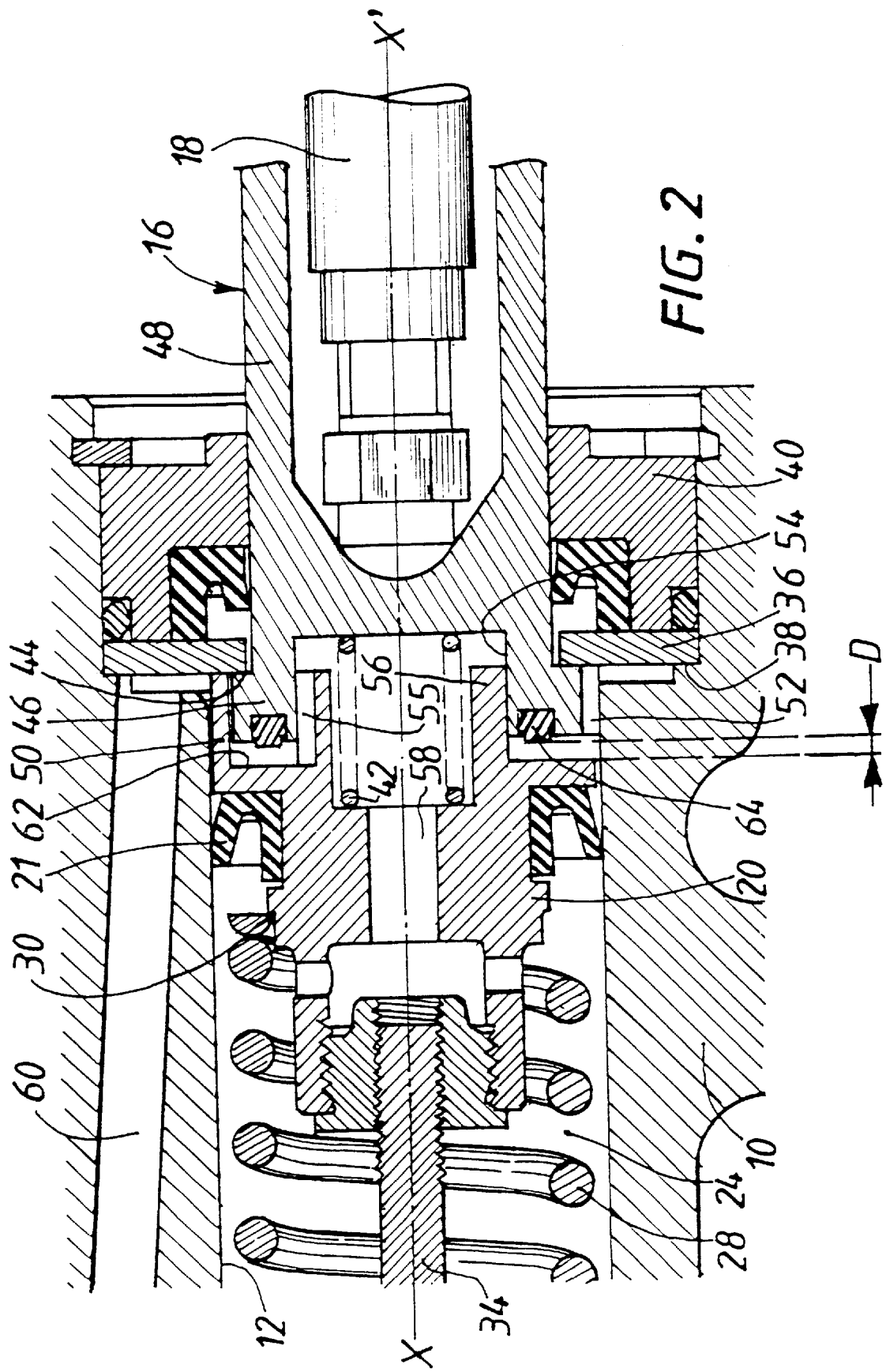
FIG. 2 is a view on a larger scale of the rear part of the master cylinder of FIG. 1.

The figures depict a master cylinder produced in accordance with the invention. By convention, the direction in which the parts move upon actuation of the master cylinder is called the "front" and the direction in which the parts move to return to their position of rest is called the "rear". In the figures, the front is therefore to the left and the rear is to the right.

The master cylinder depicted in the figures consists of a body 10 in which there is a blind bore 12. A reservoir of brake fluid at low pressure (not depicted) is connected to this master cylinder via at least one communication port 14. An actuating piston 16 is able to slide in this bore 12 under the action of a control rod 18 itself made to move by a brake pedal (not depicted) situated in the cockpit of the vehicle or by a pneumatic brake-booster (not depicted) actuated by this brake pedal.

A primary piston 20 is able to slide in leaktight fashion thanks to a cup 21 in the bore 12 and therein delimits, with the closed end of the blind bore 12 or, as has been depicted in the figures, with a secondary piston 22, a primary working chamber 24, the secondary piston 22 delimiting with the closed end of the blind bore 12 a secondary working chamber 26. The primary chamber 24 is connected to a primary brake circuit (not depicted) by a primary outlet orifice (not depicted). Likewise, the secondary chamber 26 is connected to a secondary brake circuit (not depicted) by a secondary outlet orifice (not depicted).

The primary piston 20 is urged into its rear position of rest by a device of the spring-box type, consisting of a spring 28 resting on the one hand on a shoulder 30 of the primary piston 20 and, on the other hand, on a spring cup 32 whose maximum separation from the primary piston 20 is determined by the head of a screw 34 screwed onto the front end of the primary piston 20.

In its position of rest, the primary piston 20 rests on the body 10 of the master cylinder or, as has been depicted, on a washer 36 integral with the body 10 of the master cylinder, for example arranged between a shoulder 38 of the body 10 and a device 40 that provides a seal between the inside of the master cylinder and the outside thereof, and especially between the body 10 of the master cylinder and the actuating piston 16.

The actuating piston 16 is itself urged into its rear position of rest by a compression spring 42 arranged between it and the primary piston 20. The spring 42 has a preload at rest which is less than that of the spring 28 which means that in its position of rest, the actuating piston 16 is itself also resting on the body 10 of the master cylinder or, as has been depicted, on the washer 36 integral with the body 10 of the master cylinder, via a shoulder 44 formed between a front part 46 of larger diameter and a rear part 48 of smaller diameter.

More precisely, the primary piston 20 rests on the body 10 of the master cylinder via fingers 50, of which there are at least two, uniformly angularly spaced about the axis X–X' of the master cylinder, these fingers 50 passing through axial slots 52 formed at the periphery of the part 46 of the actuating piston 16, there being as many of these slots as there are fingers 50 and these slots being uniformly angularly spaced about the axis X–X' of the master cylinder.

The fingers 50 are formed with an outer radial peripheral surface that has the same radius of curvature as that of the bore 12 so as to be able to slide in this bore 12 and they thus form a means of guiding the primary piston 20 in the bore 12. In the same way, the front part 46 of the actuating piston 16 is formed, where the axial slots 52 are not, with an outer peripheral surface that has the same radius of curvature as that of the bore 12, so as to be able to slide in this bore 12 and form a means of guiding the actuating piston 16 in the bore 12.

The front part 46 of the actuating piston 16 is formed with a blind bore 54 in which a rear part 56 of the primary piston 20 can slide in non-leaktight fashion because, for example, of axial grooves 55, SO as to guide this primary piston with respect to the actuating piston 16. The axial grooves 55 may just as well be formed on the outer peripheral surface of the rear part 56 of the primary piston 20 as on the inner peripheral surface of the blind bore 54 of the actuating piston 16.

The primary piston 20 is formed with a compensation passage 58 which, in the position of rest, allows communication between the primary working chamber 24 and the reservoir of fluid at low pressure connected to the communication 14, via the axial grooves 55, the axial slots 52, and a drilling 60 formed in the body 10 of the master cylinder.

The primary piston 20 is also formed, between the rear part 56 and the fingers 50, with an annular surface 62 perpendicular to the axis X–X' and flat, forming a seat for an annular valve 64 made of an elastomeric material such as rubber arranged on the front face of the front part 46 of the actuating piston 16. Of course, provision could be made for the annular valve to be arranged on the primary piston 20 and to interact with a valve seat formed at the front of the actuating piston 16.

From the foregoing explanations it will have been understood how the present invention is employed. At rest, all the moving parts occupy their rear position depicted in the figures. In particular, the primary working chamber 24 communicates with the reservoir of fluid at low pressure via the compensation passage 58, the axial grooves 55, the axial slots 52 and the drilling 60.

Upon actuation of the master cylinder by application of a force to the control rod 18, the actuating piston 16 leaves its position of rest and moves away from the washer 36 or from the body 10 of the master cylinder, compressing the spring 42. It continues to move in this way until the annular valve 64 comes into contact with the valve seat 62 formed on the primary piston 20. When this contact occurs, the communication between the reservoir of fluid at low pressure connected to the pipe 60 and the primary working chamber 24 is interrupted.

The travel of the actuating piston 16 needed to close the communication between the reservoir of fluid at low pressure and the primary working chamber corresponds to what is known as master cylinder dead travel.

Once this dead travel has been covered, the actuating piston 16 then makes the primary piston 20 leave its position of rest and this piston in turn moves away from the washer 36 or from the body 10 of the master cylinder, compressing the spring 28, and making the pressure in the primary working chamber 24 increase, this increase in pressure being transmitted to the wheel cylinders (not depicted) and possibly to the secondary piston 22 in the case of a tandem master cylinder.

It can therefore be clearly seen that, thanks to the present invention, the master cylinder dead travel is represented only by the distance D between the annular valve 64 borne by the actuating piston 16 and the annular surface 62 borne by the primary piston 20. Since at rest these two pistons rest on the same piece 36, it will be very easy to determine this distance D when manufacturing or assembling the master cylinder so as to give it any predetermined value, and in particular a value which is as small as desired. Furthermore, one can be sure that this distance D will be maintained over time, irrespective of the use of the master cylinder, and even if it has to be dismantled and reassembled for maintenance operations.

According to the invention, a master cylinder in which the dead travel can be fixed by construction in a simple way to any desired value, and preferably to a minimum value, and which keeps this minimum value throughout the use of the master cylinder has indeed been achieved. A minimum dead travel of this kind is furthermore obtained very simply, reliably and inexpensively.

Of course the invention is not restricted to the embodiment which has just been described, but can be modified in numerous ways which will be clear to a person skilled in the art and which fall within its scope. Thus, for example, the invention can be applied to single or to tandem master cylinders, it being possible for these master cylinders to be controlled directly by the brake pedal or by a pneumatic brake-booster, and it being possible for the secondary piston itself, in the case of a tandem master cylinder, to be of the type which has a valve, an expansion hole, or of any other type.

I claim:

1. A master cylinder for a hydraulic braking system of a motor vehicle, comprising:

a body having a bore therein;

at least one primary piston that slides in said bore, said primary piston having a compensation passage for placing a pressure chamber of the master cylinder in communication with a reservoir of fluid at a low pressure when the primary piston is located in a position of rest;

a second piston located in said bore, said second piston sliding in said bore in response to an input from a control rod to interrupt said communication;

a first compression spring for urging said primary piston toward a rear position of rest;

a second compression spring located between said primary piston and said second piston for urging said second piston toward said rear position of rest, said first compression spring having a preload force at rest that exceeds a preload force of said second compression spring, characterized in that said rear position of rest for said primary piston and for said second piston are defined by a same stop integral with said body of the master cylinder and in that said primary piston rests on said body of the master cylinder via of at least two fingers that are uniformly spaced about an axis of symmetry of the master cylinder.

2. The master cylinder according to claim 1, characterized in that said fingers of said primary piston pass through axial slots formed on a periphery surface of a front part of said second piston, said axial slots in said second piston and fingers on the primary piston being uniformly spaced about the axis of symmetry of the master cylinder.

3. The master cylinder according to claim 2, characterized in that said fingers of the primary piston are formed with an outer radial peripheral surface having a same radius of curvature as said bore in said body of the master cylinder, said fingers engaging said bore to provide a means of guiding said primary piston in said bore of the master cylinder.

4. The master cylinder according to claim 3, characterized in that said front part of said second piston has an outer peripheral surface with a same radius of curvature as said bore of said body of the master cylinder, said front part engaging said bore to provide a means of guiding said second piston in said bore of the master cylinder.

5. The master cylinder according to claim 4, characterized in that said axial slots in said second piston are formed in said outer peripheral surface of said front part.

6. The master cylinder according to claim 2, characterized in that said front part of said second piston is formed with a blind bore, said blind bore receiving a rear part of said primary piston, said rear part sliding in said blind bore in a non-leaktight fashion to form a means of guiding said primary piston with respect to said second piston.

7. The master cylinder according to claim 6, characterized in that axial grooves are formed on said outer peripheral surface of the rear part of the primary piston.

8. The master cylinder according to claim 6, characterized in that axial grooves are formed on an inner peripheral surface of said blind bore of said second piston.

9. The master cylinder according to claim 2, characterized in that said primary piston has an annular surface perpendicular to an axis of symmetry of the master cylinder, said annular surface forming a seat for an annular valve arranged on a front face of said front part of said second piston.

10. The master cylinder according to claim 2, characterized in that the front face of said front part of said second piston is formed with an annular surface, said annular surface being flat and perpendicular to an axis of symmetry of the master cylinder, said annular surface forming a seat for an annular valve arranged on the primary piston.

* * * * *